(12) United States Patent
Tucker et al.

(10) Patent No.: US 7,237,782 B2
(45) Date of Patent: Jul. 3, 2007

(54) REAR GATE ASSEMBLY FOR SHOPPING CART

(75) Inventors: James B. Tucker, Dunnesville, VA (US); Verlyn C. Ruger, Bellevue, MI (US); Larry S. Hubbard, Hastings, MI (US)

(73) Assignee: United Steel & Wire Company, Battle Creek, MI (US)

( * ) Notice: Subject to any disclaimer, the term of this patent is extended or adjusted under 35 U.S.C. 154(b) by 278 days.

(21) Appl. No.: 11/064,901

(22) Filed: Feb. 24, 2005

(65) Prior Publication Data

US 2006/0186620 A1 Aug. 24, 2006

(51) Int. Cl.
*B62B 3/02* (2006.01)
(52) U.S. Cl. ............................. 280/33.991; 280/33.992
(58) Field of Classification Search ........... 280/33.991, 280/33.993, 33.996, 33.997, 33.998, 33.992, 280/DIG. 4
See application file for complete search history.

(56) References Cited

U.S. PATENT DOCUMENTS

| 3,999,774 | A | * | 12/1976 | Rehrig | ................... | 280/33.991 |
| 4,046,394 | A | | 9/1977 | Thompson, Jr. | | |
| 4,065,142 | A | | 12/1977 | Rehrig | | |
| 4,176,849 | A | * | 12/1979 | Rehrig | ................... | 280/33.993 |
| 4,650,199 | A | * | 3/1987 | Rehrig | ................... | 280/33.997 |
| D294,419 | S | | 2/1988 | Rehrig | | |
| 5,368,318 | A | * | 11/1994 | Rehrig et al. | ........... | 280/33.993 |
| 5,458,347 | A | | 10/1995 | Chiv | | |
| D400,679 | S | | 11/1998 | Kern et al. | | |
| 5,865,448 | A | * | 2/1999 | Kern et al. | ............. | 280/33.992 |
| 5,947,313 | A | | 9/1999 | Kern et al. | | |
| 6,761,364 | B2 | * | 7/2004 | Murar et al. | ........... | 280/33.991 |
| 6,983,944 | B2 | * | 1/2006 | Bergia | ................... | 280/33.991 |
| 2002/0135144 | A1 | * | 9/2002 | Murar et al. | ........... | 280/33.991 |
| 2003/0057666 | A1 | * | 3/2003 | Murar et al. | ........... | 280/33.991 |
| 2006/0186620 | A1 | * | 8/2006 | Tucker et al. | .......... | 280/33.991 |

FOREIGN PATENT DOCUMENTS

GB 2 181 097 A 4/1987
WO WO 93/02903 2/1993

* cited by examiner

*Primary Examiner*—J. Allen Shriver
(74) *Attorney, Agent, or Firm*—Flynn, Thiel, Boutell & Tanis, P.C.

(57) ABSTRACT

A vertically swingable rear gate assembly for closing an open rear side of a shopping cart basket. The gate assembly includes a monolithic one-piece plate-like molded plastic gate member sized to substantially close off the rear side of the basket. A rigid one-piece connecting frame is disposed primarily adjacent a rear side of the gate member and includes a pair of generally transversely aligned top hinge parts for vertical hinged connection to the shopping cart. The connecting frame, adjacent an upper edge, has a downwardly-opening, transverse channel structure which engages over and confines an upper edge portion of the gate member. The lower part of the connecting frame is fixedly joined to the gate member at a location adjacent the bottom edge thereof.

22 Claims, 9 Drawing Sheets

REAR GATE ASSEMBLY FOR SHOPPING CART

FIELD OF THE INVENTION

This invention relates to a wheeled shopping cart and, more specifically, to an improved rear gate assembly as associated with the cart basket.

BACKGROUND OF THE INVENTION

Shopping carts are extensively utilized in retail stores such as supermarkets and department stores to facilitate handling of merchandise by customers. The shopping carts are provided with a basket which is frequently constructed principally of plastic since plastic baskets are believed to create less damage within the store. Plastic baskets also enable the store to select a color compatible with their business color. Shopping carts employing a plastic basket have frequently utilized a rear gate assembly for closing off the basket which is constructed from wire rod since such rear gate is subjected to rather severe forces or impacts when similar carts are nested one within the other. While some carts have provided a rear gate assembly constructed at least partially of plastics, such as providing a main rear gate member molded of plastic, nevertheless most existing constructions of this type are believed to be undesirably complex with respect to the manner in which the plastic rear gate member connects to the basket and mounts thereon a collapsible child seat assembly, the latter frequently being constructed of metal rods.

Accordingly, it is an object of this invention to provide an improved rear gate assembly for a shopping cart, particularly a shopping cart employing a molded plastic basket, which improved rear gate assembly utilizes a one-piece molded plastic rear gate panel which, as it connects both to the cart and to the collapsible child seat assembly carried thereon, facilitates the overall assembly of the rear gate assembly to the shopping cart.

Other objects and purposes of the invention will be apparent to persons familiar with constructions of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the end of the cart which is remote from the handle, and the word "rear" will refer to the end of the cart having the handle. The words "inwardly" and "outwardly" will refer to directions toward and away from, respectively, the geometric center of the cart and designated parts thereof. Said terminology will include the word specifically mentioned, derivatives thereof, and words of similar import.

DETAILED DESCRIPTION

Figure 1:
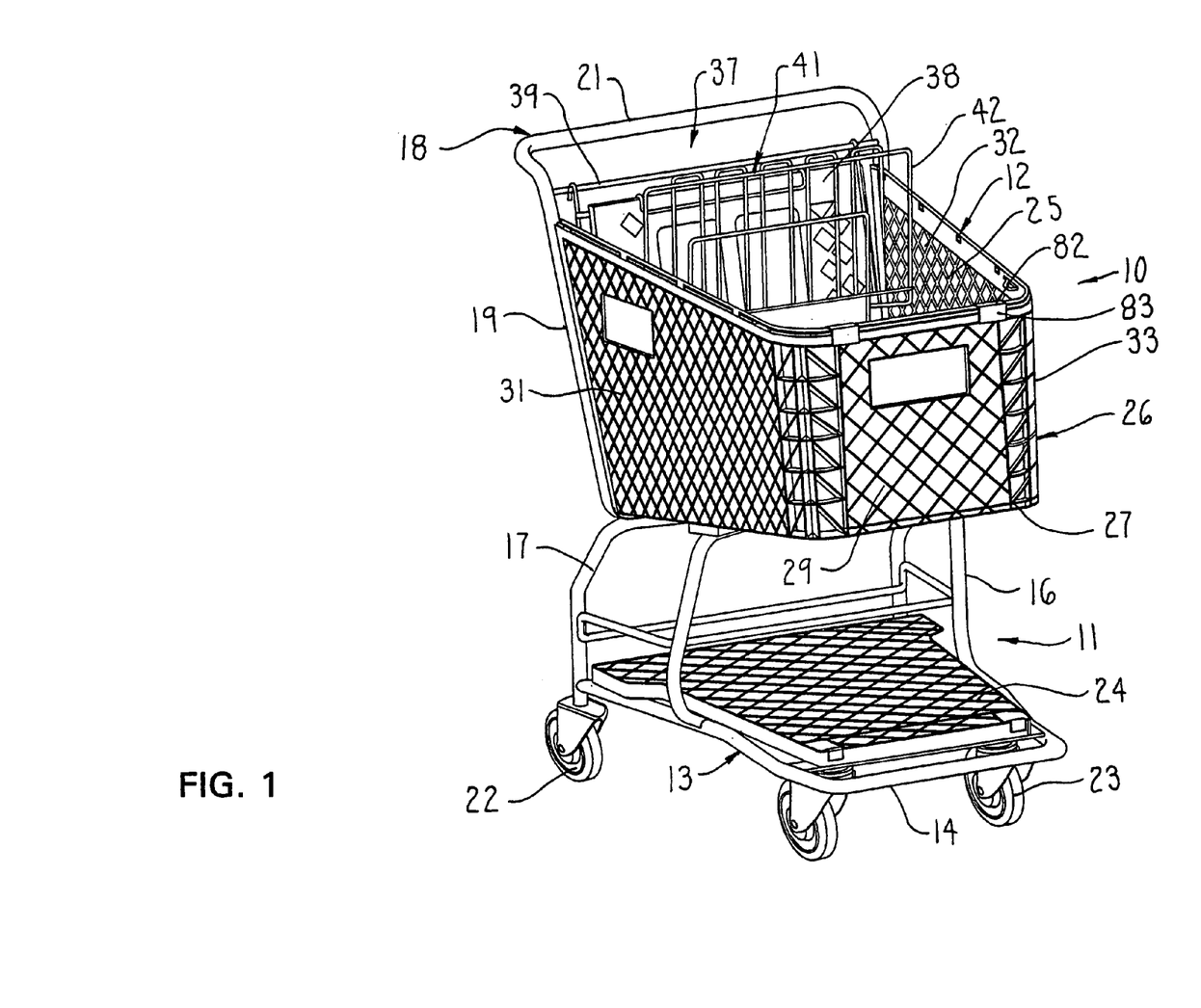
FIG. 1 is a perspective view of a wheeled shopping cart.

Referring to FIG. 1, there is illustrated a wheeled shopping cart 11 which is defined principally by a rigid frame or base assembly 12 on which is supported a basket arrangement 13. The basket arrangement 13 opens upwardly and defines therein a compartment for storage of merchandise.

The frame assembly 12 includes a generally U-shaped base member 16 which opens rearwardly to permit nesting of similar carts, such being conventional. The base member 16 is rigidly secured to front and rear basket supports 17 and 18, respectively, the latter being generally inverted U-shaped members which project upwardly from the base member 16 for supportive engagement with the bottom wall of the basket arrangement adjacent the middle and rear edge thereof.

The base member 16, as illustrated in FIG. 1, may optionally be provided with a bottom tray 19 which is supported on and spans across the U-shaped base member for supporting merchandise thereon.

The front of the base is traditionally provided with a pair of front casters 21 associated therewith, and a pair of rear wheels 22 are traditionally mounted adjacent the rear corners thereof.

Considering now the upwardly-opening basket arrangement 13, in the illustrated and preferred embodiment, this basket arrangement includes a basket member 24 which is defined principally by a bottom wall 26 which adjacent the peripheral edge thereof is joined to an upright sidewall arrangement defined principally by a front wall 27 and opposed right and left side walls 28 and 29 which project rearwardly from adjacent opposite front corners of the basket member. The basket member 24 is preferably molded in one piece of a plastics material, such as by an injection molding technique, and all of the walls thereof are preferably defined by pluralities of transversely intersecting ribs so as to define an open latticework or gridwork.

The cart 11 also includes a pair of side frame elements 31 which are disposed adjacent and extend upwardly along the rear edges of the basket side walls 28 and 29, with the side walls being appropriately fixedly secured to the respective side frame element 31, such as by rivets or conventional fastening techniques. The side frame elements 31 at their lower ends are fixedly and rigidly joined to the base assembly and, in the illustrated embodiment, effectively extend upwardly generally as extensions of the side legs associated with the rear basket support 18. These side frame elements 31 also extend upwardly and typically are curved rearwardly away from the rear upper corner of the basket side walls and are transversely joined together by a cross member 32 which is spaced somewhat rearwardly and upwardly relative to the upper rear corners of the basket. This cross member 32 functions as a rear handle for the cart, and is typically provided with a suitable gripping sleeve therearound, such as of a plastics material.

The basket arrangement 13 also includes a rear gate arrangement 36 for closing off the upright rear side of the one-piece basket member 24. The rear gate arrangement 36 is hingedly supported from a support rod or shaft 37 which extends horizontally across the cart adjacent the rear upper corner of the basket. This support rod 37, as illustrated, is preferably disposed in generally parallel relation to the handle 32 but is spaced a small distance therefrom, such as by being spaced slightly forwardly and downwardly relative to the handle, with opposite ends of the support rod 37 being mounted within suitable openings formed in the pair of side frame elements 31.

The rear gate arrangement 36 is swingably supported on and normally suspended downwardly from the support shaft 37, and the lower end of the rear gate arrangement is adapted to abut against a front side of a stop flange (not shown) which is integrally joined to and projects upwardly from the bottom wall of the basket member directly adjacent the rear free edge thereof. This stop flange and its engagement with the lower free end of the rear gate arrangement hence normally maintains the rear gate arrangement in its suspended position so as to effectively close off the rear side of the basket, while at the same time enabling the rear gate assembly to be swingably moved inwardly and upwardly about the hinge rod 37 so as to permit baskets of similar carts to be partially nested one within another in a conventional manner.

Considering now the rear gate arrangement 36, and referring specifically to FIGS. 2-10, this arrangement includes a rear gate member or panel 42 which mounts thereon a rigid coupling frame 43 for providing a hinged connection to the support shaft 37 (FIG. 1).

Figure 8:
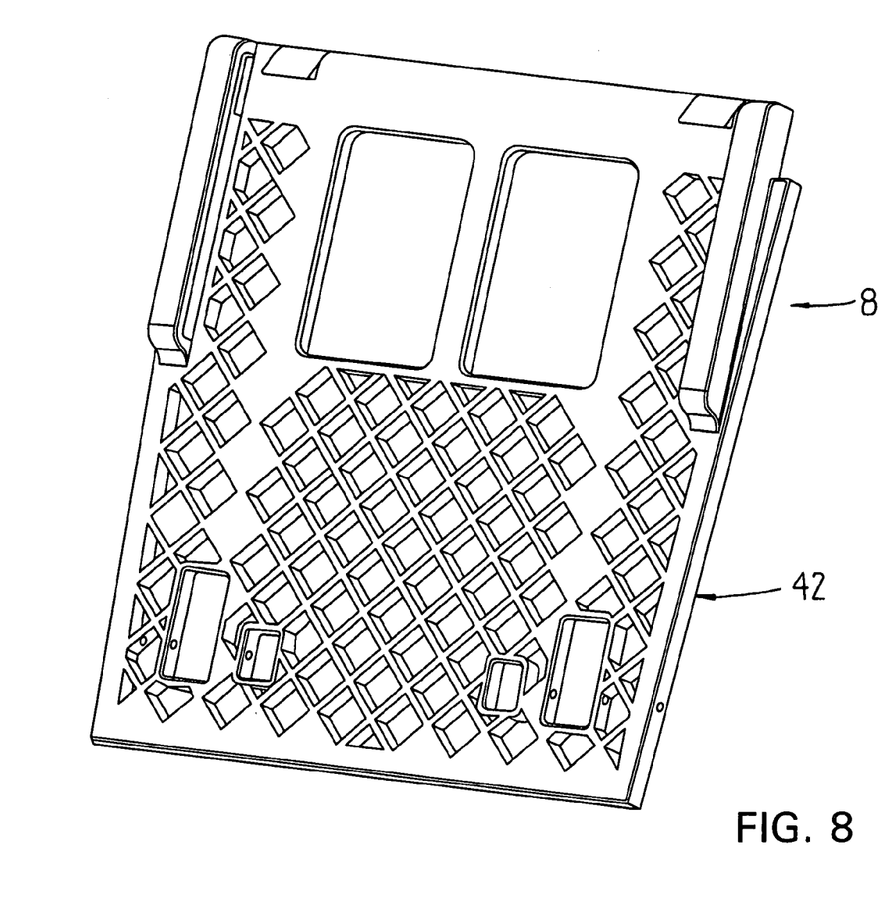
FIG. 8 is a front perspective view of solely the rear gate panel.

The rear gate member 42 is preferably formed as a monolithic one-piece molded plastic member having a configuration which is generally platelike as defined between generally flat and parallel front and rear surfaces 44 and 45, respectively. The one-piece gate member 42 has a surrounding peripheral rim which effectively defines generally parallel and horizontally extending top and bottom edges 46 and 47, respectively, which at opposite ends are appropriately joined by vertically extending side edges 48. These latter edges, as defined by the surrounding frame or rim of the gate member, are appropriately joined to sets of parallel but transversely intersecting ribs which extend across the interior of the peripheral frame, so that the rear gate member has a generally opened latticework or gridwork construction as defined interiorly of the perimeter frame. In the illustrated embodiment the gridwork associated with the rear gate principally involves two sets of ribs wherein the individual ribs extend diagonally in generally transverse and more specifically perpendicular relationship to define a diamond-shaped lattice, but the gate member is also provided with several reinforcing ribs extending vertically thereof, such as between the top and bottom edges of the rear gate member, for reinforcing purposes. Some of the openings defined by the lattice are also skinned over for structural and/or decorative purposes.

The rear gate member 42 mounts thereon the rigid coupling frame 43, the latter being of a rigid one-piece construction in the illustrated embodiment, and defined principally by first and second generally U-shaped frame members 51 and 56, respectively.

The first U-shaped frame member 51 is positioned directly adjacent the rear surface 45 of the gate member 42 and includes a generally straight base leg 52 which is spaced downwardly from and extends generally parallel to the upper edge 46 of the rear gate member. This base leg 52 hence extends generally horizontally in transverse relationship at the rear side of the cart.

Figure 2:
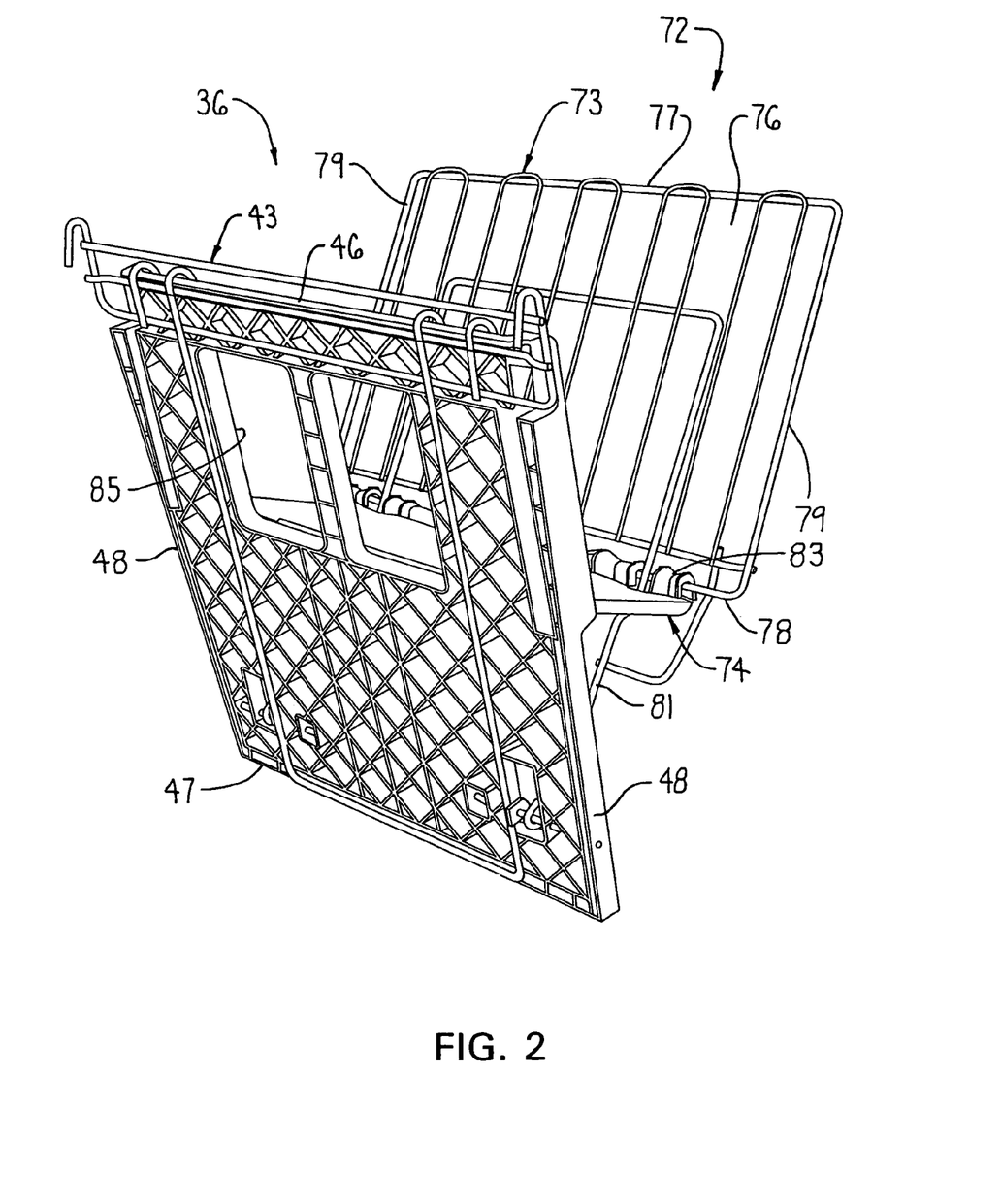
FIG. 2 is a rear perspective view of solely the rear gate arrangement and showing the child seat in an open position.
Figure 3:
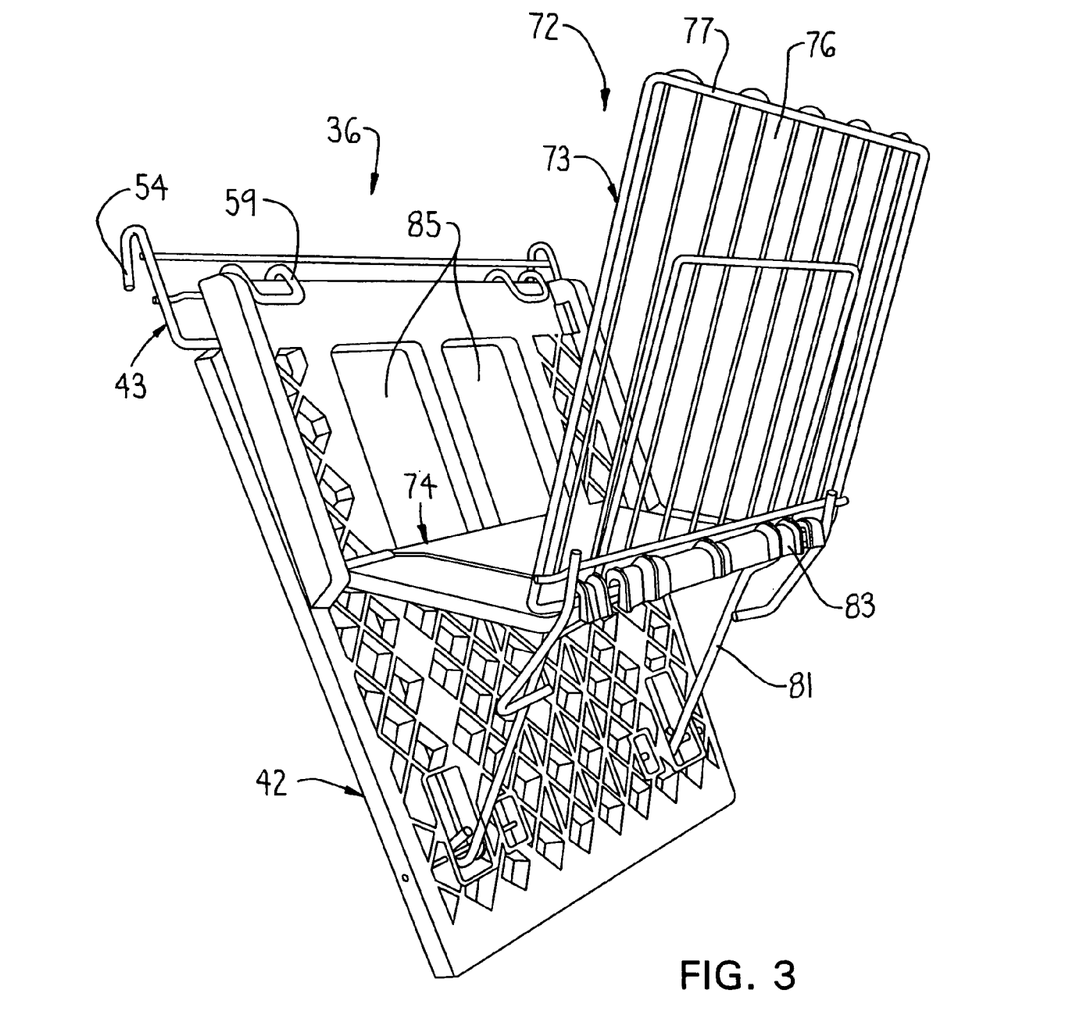
FIG. 3 is a front perspective view of the rear gate arrangement.
Figure 7:
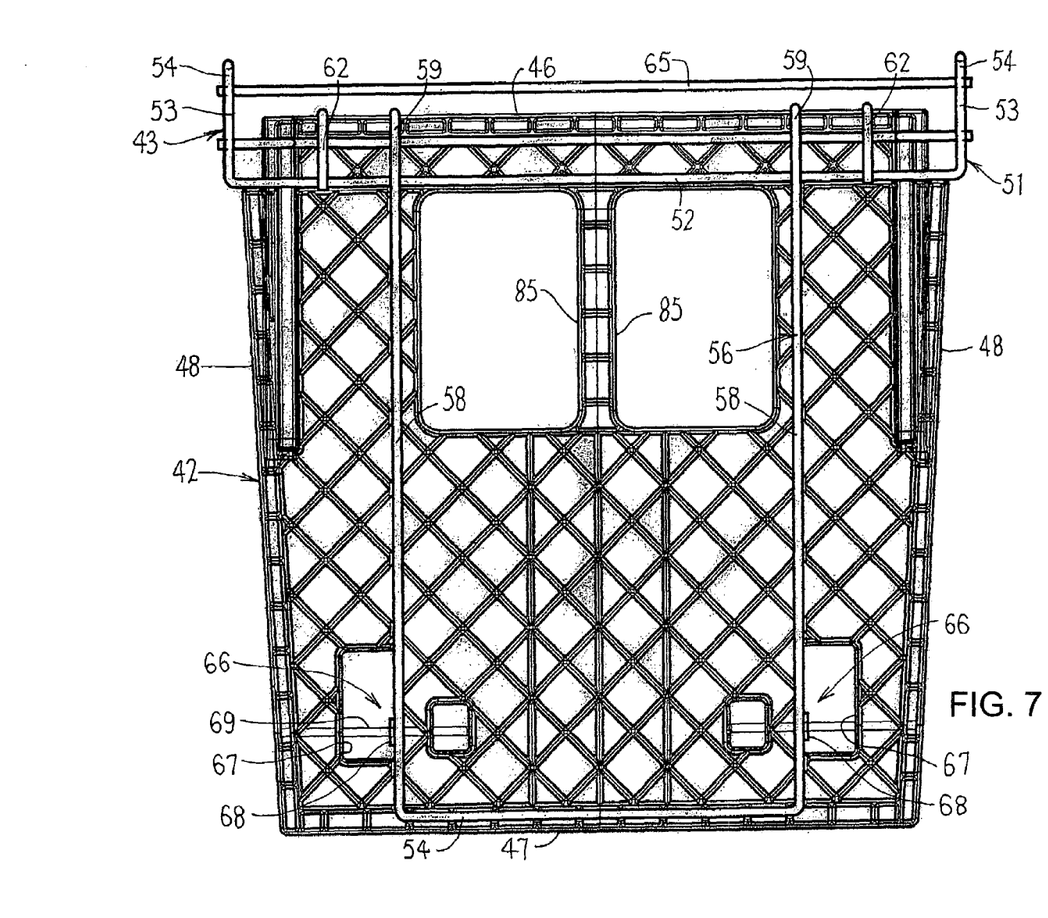
FIG. 7 is a rear elevational view showing only the rear gate member and the connector frame.
Figure 9:
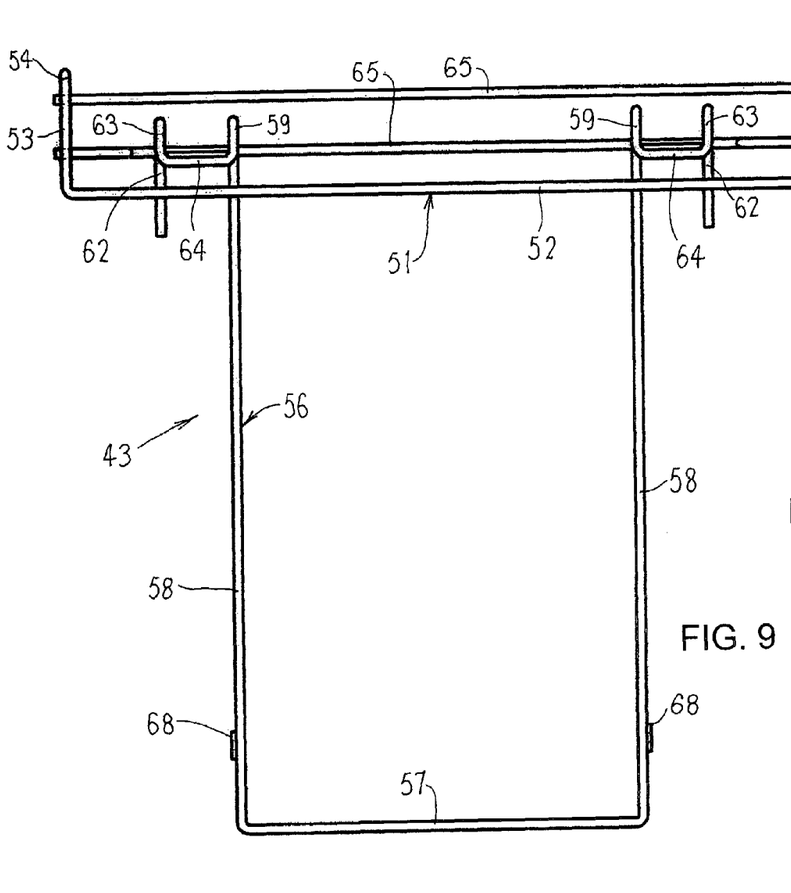
FIG. 9 is a front elevational view of solely the connector frame.
Figure 10:
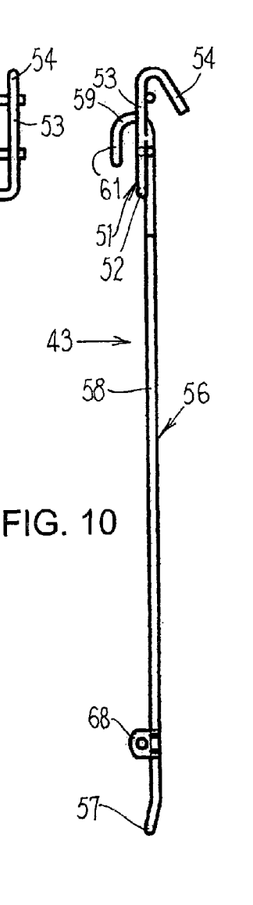
FIG. 10 is a side view of the connector frame shown in FIG. 9.

As illustrated in FIGS. 2, 7 and 9, the base leg 52 has a length whereby it extends over a significant majority of the width of the rear gate member adjacent the upper edge thereof, and opposite ends of the base leg 52 are rigidly joined to a pair of generally parallel side legs 53 which protrude radially relative to the longitudinal axis of the base leg 52 and are cantilevered upwardly so as to extend beyond the upper edge of the rear gate member. These cantilevered side legs 53, adjacent their free ends, are provided with hooks or partial loops 54 which are disposed to at least partially surround the support rod 37, with these hooks 54 being sufficiently closed or crimped so as to create a captive but relatively rotatable connection with respect to the support rod 37. The pair of hooks 54 as associated with the first frame member 51 are preferably displaced sidewardly a substantial distance so that the pair of hooks 54 are disposed closely adjacent but spaced small distances inwardly from the adjacent upright side frame elements 31.

The first frame member 51, as illustrated and described, is preferably formed by being suitably bent from a single elongate piece of wire rod for convenience of manufacture.

As to the second U-shaped frame member 56, it is fixedly and rigidly joined to the first frame member 51, and creates an engagement with the one-piece rear gate member 42.

As illustrated by FIGS. 2, 7 and 9, this second U-shaped frame member 56 is also positioned so as to generally overlie the rear surface of the gate member 42 and includes a generally horizontally extending base leg 57 which extends generally parallel with the base leg 52 of the first frame member, but is positioned to overlie the gate member closely adjacent the bottom edge 47 of the gate member. This base leg 57, at opposite ends, is rigidly joined to a pair of generally parallel side legs 58 which are cantilevered radially outwardly from the respective base leg, and which extend upwardly along the rear surface of the gate member 42 so as to terminate generally adjacent the upper edge 46 thereof. The cantilevered side legs 58, adjacent their upper free ends, are provided with generally downwardly-opening U-shaped hooks 59 which effectively wrap around the top edge 46 of the rear gate member 42 so that the free leg 61 (FIG. 10) of the hook 59 protrudes partially downwardly along the front surface 44 of the rear gate member, thereby captivating the upper edge of the rear gate member 42 within the pair of sidewardly-spaced hooks 59.

The rigid coupling frame 43 as shown in FIG. 9 also has a secondary hook member 62 associated with each of the side legs 58. This secondary hook member 62 extends generally parallel and is spaced sidewardly a small distance from the leg 58, and the lower end of the secondary hook member 62 is suitably fixedly secured, as by welding, to the base leg 52. The secondary hook member 62 at its upper end is provided with a generally downwardly-opening U-shaped open hook 63 which is identical to and transversely aligned with the adjacent hook 59 so as to assist in confining the upper edge of the gate member 42 therein. In the illustrated embodiment, the front-side parts of the hooks 59 and 63, at their lower ends, are appropriately joined by a suitable cross rod 64 so as to provide for strengthening and rigidification of the adjacent hooks, and thereby providing an elongate channel-like structure for confining engagement with the upper edge of the rear gate member 42.

In the illustrated arrangement, the second U-shaped frame member 56 as well as the secondary hook members 62 are formed as an integral one-piece construction by being bent from a one-piece elongate wire rod. This construction facilitates manufacture, and minimizes connection or weld points as well as minimizes free or cut edges. The first and second U-shaped frame members 51 and 56, respectively, can also be additionally reinforced and rigidly joined by provision of one or more cross rods 65 which extend generally parallel to the base leg 52 but are spaced upwardly therefrom so that opposite ends of the cross rods 65 are appropriately rigidly joined, such as welded, to the side legs 53 intermediate the lengths thereof. The cross rod 65, as well as the base rod 52, both effectively contact the side legs 58 at two spaced locations, which locations are preferably fixed, such as by welding, to provide a rigid joining of the frames.

To retain the upper edge portion of the rear gate member 42 within the channel structures defined by the top hooks 59 and 63, the lower portion of the second frame member 56 is rigidly coupled to the rear gate member 42. This latter coupling involves a pair of sidewardly spaced connections 66 (FIG. 7) which are disposed adjacent the lower edge of the rear gate member and which cooperate with the respective side legs 58.

To facilitate making of the connections 66, the rear gate member 42 has a pair of openings 67 extending transversely therethrough, which openings are disposed uniformly spaced from and on opposite sides of the vertical centerline of the rear gate member, and in the illustrated embodiment are generally rectangular in shape and are surrounded by ribs which effectively define an open rectangular frame. Each of the coupling frame side legs 58, in the vicinity of the lower end thereof, passes vertically across a respective one of the openings 67 adjacent the rear side of the rear gate member. The respective side leg 58, where it passes over the opening 67, has a generally small connecting plate 68 fixed thereto, as by welding, whereby this plate 68 projects forwardly into the respective opening 67. The connecting plate 68 has a small opening passing therethrough, which plate opening aligns with similar openings formed in the side ribs defining the opening 67, and which openings also open outwardly through the side wall or rim of the rear gate member 42. This series of aligned openings as defined in the rear gate member, and their alignment with the small opening in the connecting plate 68, enable a rather short connecting pin 69 to be slidably inserted through the openings, by being inserted through the respective side rim of the gate member so that the pin 69 passes through the opening in the connecting plate 68 and also through the opening associated with the inner side wall of the rim defining the opening 67, whereby the pin 69 is hence seated at both ends. When so seated, then the connecting pin 69 is appropriately deformed, such as by a crimping operation, to create a projection which effectively prevents the pin 69 from moving axially and hence disengaging the connecting plate 68.

As shown in FIG. 7, a pair of short connecting pins 69 are provided and are inserted into the rear gate member 42 from opposite sides thereof so as to hence create a securement with the connecting plates 68 associated with the pair of side legs 58. This hence results in a positive securement of the lower end of the U-shaped frame 56 to the rear gate member, and hence positively retains the upper edge of the rear gate member within the downwardly-opening channel structure defined by the top hooks 59 and 63.

Figure 11:
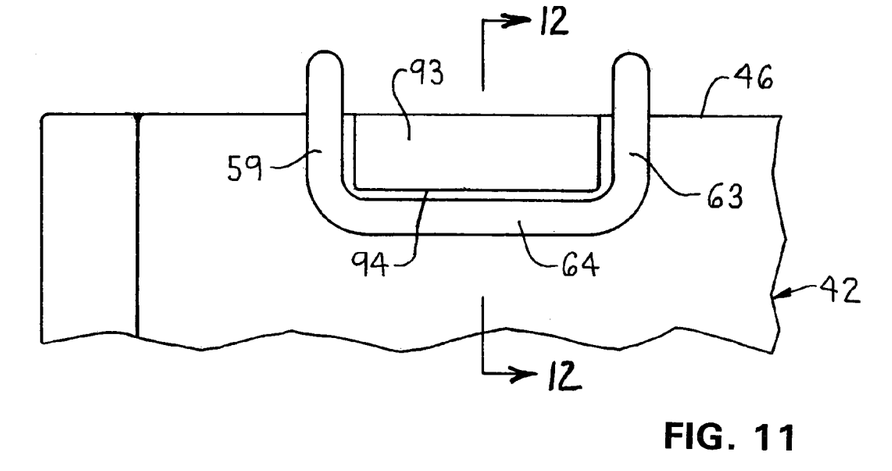
FIG. 11 is an enlarged fragmentary front elevational view of the upper corner of the rear gate panel and showing connection thereto of the hook associated with the connecting frame.

To assist in securement of the rear gate member 42 to the connecting frame 43, and to ensure positive retention of the upper edge portion of the rear gate member 42 within the channel structures defined by the top hooks 59 and 63, the rear gate member 42 is additionally provided with a pair of catches or retainers 93 (FIGS. 11-12) which cooperate with the channel structures defined by the top hooks 59 and 63. The catches 93 are disposed directly adjacent the upper edge 46 of the gate member 42 in sidewardly spaced relationship so as to be positioned for cooperation with the pair of channel structures defined by the connecting frame. Each of the catches 93 is molded as an integral and monolithic part of the gate member 42 and projects outwardly from the front surface 44 thereof. The catch 93, in vertical cross section, has a generally ramp-like profile which starts at the upper edge 46, with this ramp-like profile then sloping outwardly away from the front surface 44 as the profile protrudes downwardly over a small extent, whereby the catch terminates at a lower end defined by a downwardly facing shoulder or abutment 94. The catch 93, in the transverse direction of the gate member as illustrated by FIG. 11, has a width which is slightly less than the spacing between the cooperating adjacent hooks 59 and 63 so as to be positionable therebetween.

Figure 12:
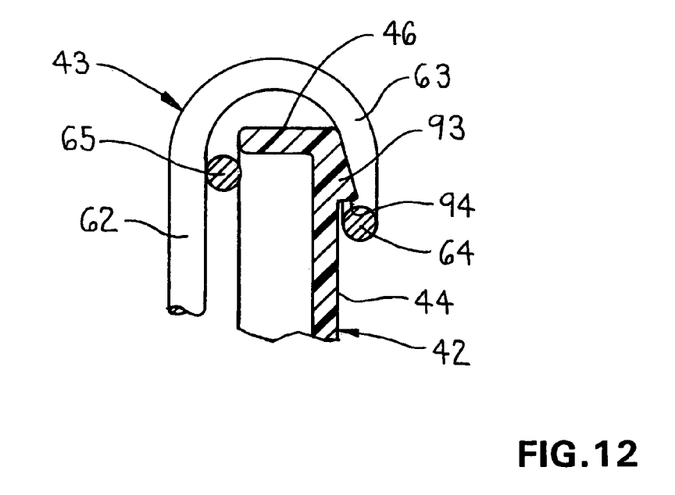
FIG. 12 is a sectional view taken along line 12-12 in FIG. 11.

When the connecting frame 43 is assembled to the gate member 42 by insertion of the upper edge of the gate member into the channel structure defined by hooks 59 and 63, the bight or cross piece 64 associated with each hook engages and slides downwardly along the ramp-like catch 93 and, when the upper edge portion of the gate member is substantially fully seated into the channel structure, the bight or cross piece 64 effectively resiliently snaps into a position below the shoulder 94. The ramp-shaped catches 93 hence then effectively create a positive retention of the upper edge portion of the gate member within the channel structures so as to prevent inadvertent separation therebetween.

The one-piece molded plastic rear gate member 42 is hence supported and joined to the one-piece rigid coupling frame 43 requiring solely the two coupling pins 69 for creating the desired support and securement of the rear gate member, thereby minimizing the use of additional fasteners and in particular minimizing required additional crimping operations which can be damaging and unsightly, particularly when utilizing chrome-plated steel rod for defining the coupling frame and the connecting pieces.

The coupling frame 43 used for mounting the plastic rear gate member 42, and specifically the vertically elongate side legs 58 associated with the second U-shaped frame 56, act as sliding guide rods to facilitate swinging of the rear gate assembly upwardly into and downwardly away from the raised position during nesting of like carts. In this respect, as illustrated in FIG. 1, the cart basket has a pair of generally downwardly-opening channel-shaped guards 86 mounted on the top rim of the basket front wall in sidewardly spaced relationship. These guards may be constructed of either plastic or metal. When a basket of a first cart is moved into nesting relationship within a basket of a second cart, the side legs 58 which extend throughout substantially the full height of the rear gate, as associated with the basket of the second cart, engage and slide along the guards 86 associated with the basket of the first cart as the latter nestingly moves into the interior of the second cart's basket, causing the rear gate assembly of the second cart to swing upwardly. The disposition of these side legs 58 so that they engage and slide along the guards 86 associated with the basket front wall hence facilitates nesting by providing a low friction slidable guiding of the side legs 58 along the front guards 86.

The rear gate arrangement 36 mounts thereon a foldable child seat arrangement 72 which is defined principally by a back member 73 which is swingably supported on the rear gate member, and a seat member 74 which is hingedly and slidably connected between the rear gate member 42 and the back member 73.

The back member 73 is defined primarily by a platelike seat back 76 which extends between upper and lower edges 77 and 78, which edges project between opposite side edges 79, thereby defining a generally rectangular frame which, in the illustrated embodiment, is constructed of wire rod and is provided with suitable cross wires so as to provide a generally flat surface for supportive engagement with the back of a seated child.

Figure 4:
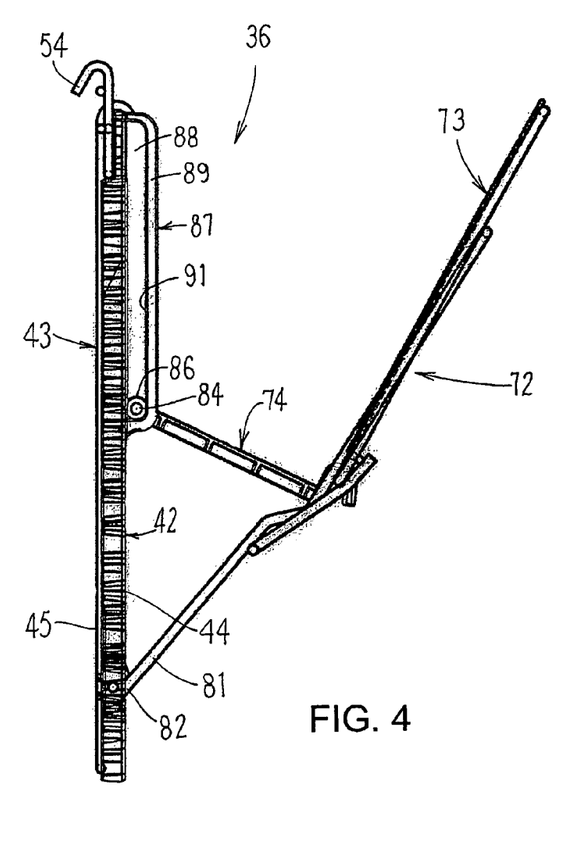
FIGS. 4 and 5 are side elevational views of the rear gate arrangement and showing the child seat in the open and closed positions, respectively.
Figure 5:
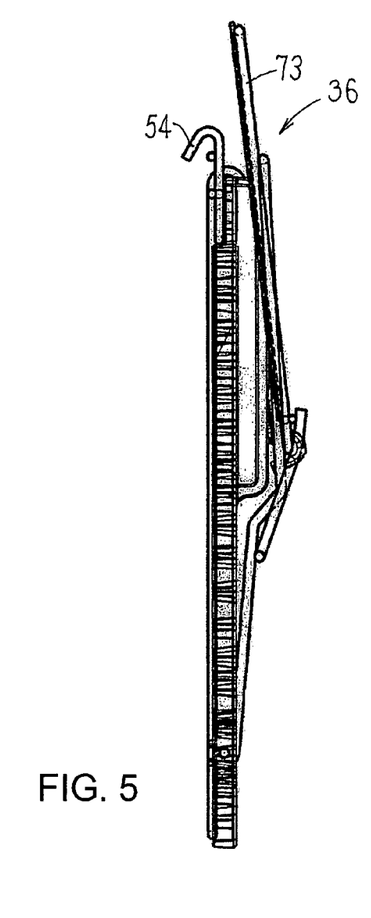
Figure 6:
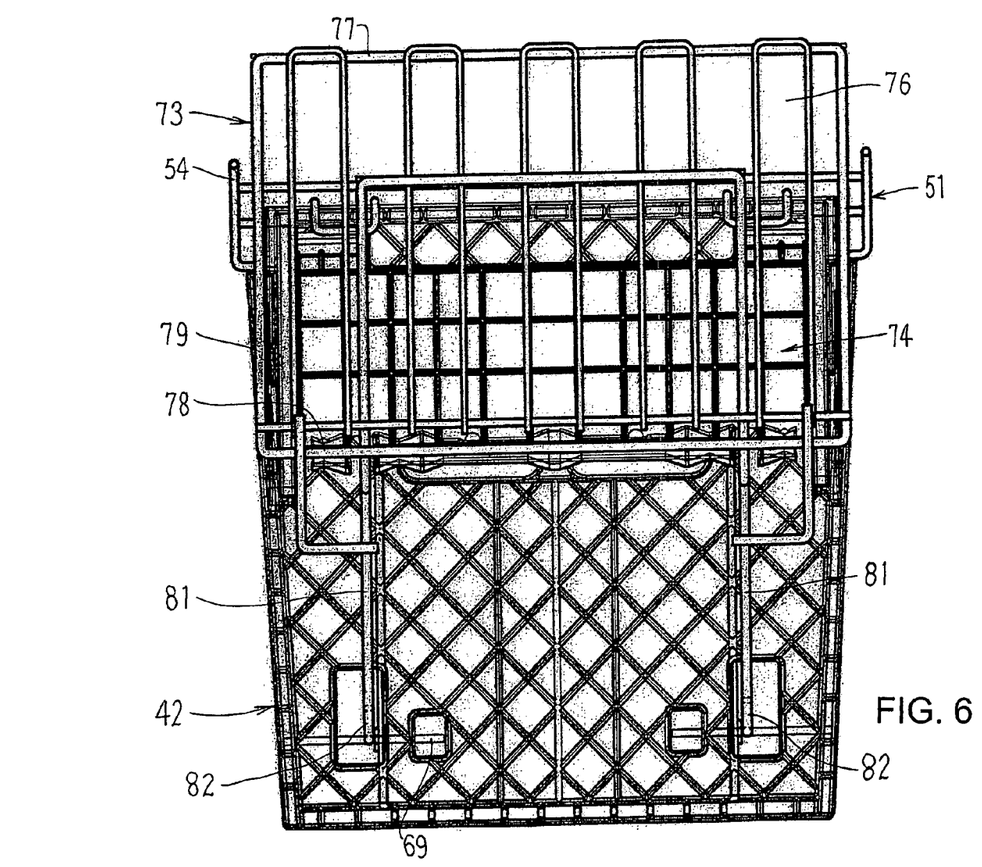
FIG. 6 is a front elevational view of the rear gate arrangement with the child seat assembly in a closed position.

The seat back 76 is rigidly joined to a pair of elongate and generally parallel side frames or legs 81 which protrude downwardly and, at the lower free ends, are provided with loops or hooks 82 which are rotatably captivated about the connecting pins 69, whereby each of the hooks 82 is hence disposed in close proximity to one of the connecting plates 68. These hooks 82 provide a pivotal support so as to enable the back member 72 to vertically swing about the horizontal axis defined by the aligned connecting pins 69, whereby the back and the overall seat arrangement hence can be moved between open and collapsed positions, as illustrated by FIGS. 4 and 5.

The seat member 74 has a generally flat configuration so as to enable a child to be seated thereon, and the front edge thereof defines a front hinge structure 83 which is engaged with the lower cross rod 78 of the back so as to define a horizontal hinge therebetween, thereby permitting relative vertical pivoting between the seat and back members.

The opposite edge of the seat member 74, namely the rear edge, is provided with a rear support rod 84 which extends horizontally therealong and is provided with rollers or guides 86 on opposite ends thereof. These rollers 86 in turn are moveably confined for engagement with a pair of generally parallel guide tracks 87 which are disposed in sidewardly spaced relationship and extend upwardly along the rear gate member 42. The guide tracks 87 are disposed in sidewardly spaced relationship on opposite sides of the longitudinal centerline of the gate member, and are each of generally L-shaped cross section so that each includes a base leg 88 which protrudes outwardly from the front surface 44 of the gate member, which base leg in turn joins to an outer leg 89 which projects transversely from the base leg so as to extend generally parallel but spaced outwardly from the front surface of the gate member. Each L-shaped guide track 87, and its cooperation with the front surface of the gate member 42, hence defines an elongate guide channel 91 which extends vertically along the gate member, with the guide channels defined by the pair of tracks opening inwardly in opposed relationship to one another so as to permit the rollers 86 to move therealong.

The guide tracks 87 in the illustrated embodiment are preferably molded as an integral and monolithic part of the plastic gate member 42. Each of these tracks, adjacent the upper and lower ends thereof, is preferably provided with a suitable stop which, for example, provide a lower limit for engagement with the respective roller 86 to hence provide supportive engagement with the seat member in a general horizontal orientation when the child seat assembly is in the open position. When in this open position, the region above the seat member communicates with a pair of leg openings 85 which open through the rear gate panel 42.

When the child seat 74 is moved into its closed position, the seat member 74 hinges vertically upwardly about the front hinge 83 so that the rollers 86 are guided upwardly within the guide tracks 87, and simultaneously the seat back 73 is vertically hinged rearwardly about the axis defined by the connecting pins 69 so that the collapsed seat and back members effectively overlie the front side of the rear gate member 42 as illustrated in FIG. 5.

While the back member 73 has been illustrated as being constructed from wire rod, it will be appreciated that the back member, either partially or totally, could be constructed of plastic, such as by being suitably molded, which plastic back member could be appropriately reinforced with metal rod if necessary or desired.

As to the seat member 74, it is illustrated as being constructed in one piece of molded plastic, but it will also be appreciated that said seat member itself could be defined by wire rod, such being conventional.

With the construction of the present invention, particularly the rear gate assembly, the one-piece monolithic molded plastic gate member 42 hence can be readily assembled inasmuch as the connecting frame 43 and the channel-like structures associated with the upper edge thereof hence enables the plastic gate member to be slidably inserted into the downwardly-opening channel structure which hence sidewardly confines and limits the upward position of the upper edge of the gate member, and the lower portion of the connecting frame then is coupled to the lower portion of the gate member by the connecting pins 69 which are slidably supported on the gate member and then secured in position by crimps. This hence minimizes the number of actual connecting pieces, and at the same time minimizes any crimps or cut or sharp ends, particularly adjacent the upper portion of the gate member, and hence facilitates not only the overall connection of the gate assembly, including its connection to the cart, but also minimizes the locations which are subject to deterioration, particularly since the connecting frame and the various connection points are typically formed from chrome-plated steel rod.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A wheeled shopping cart, comprising:
   a frame defining a wheeled base and a pair of sidewardly spaced frame elements rigidly joined to the base and projecting upwardly adjacent a rear of said cart;
   an upwardly opening basket supported on said base and rigidly joined to said frame, said basket including front, right and left side walls projecting upwardly from a perimeter of a bottom wall;
   a handle supported on and extending transversely between said frame elements at a location adjacent a rear upper edge of said basket; and
   a rear gate assembly hingedly supported on said frame for vertical swinging movement between suspended and raised positions, said gate assembly in said suspended position being in a generally upright orientation wherein it is disposed at and substantially closes off an upright rear side of said basket and is swingably supported on a cross shaft which extends transversely across the cart and is located adjacent a rear upper edge of said basket;

said rear gate assembly including
(a) a monolithic one-piece platelike molded plastic gate member having height and width dimensions so as to substantially close off the upright rear side of the basket when the gate assembly is in the suspended position, said gate member in said suspended position having an upper edge disposed closely adjacent the handle and a lower edge disposed closely adjacent a rear edge of the bottom wall of said basket,
(b) a rigid one-piece connecting frame disposed primarily adjacent a rear side of said gate member and including a hinge part adjacent an upper edge of said gate member and defining a vertically hinged connection with said cross shaft,
(c) said rigid connecting frame adjacent an upper end thereof including a transversely extending channel structure which is engaged over and confines the upper edge of said gate member therein, and
(d) a connecting part connected between said rigid connecting frame and said gate member at a location spaced downwardly from said upper edge to fixedly join said connecting frame and said gate member.

2. A shopping cart according to claim 1, wherein the channel structure is defined by a pair of transversely aligned hooks which are formed of wire rod and define downwardly-opening U-shaped channels to confine the upper edge of the gate member therein, said pair of hooks having front legs which project downwardly a limited extent so as to overlap a front side of said gate member in the vicinity of the upper edge thereof, said front legs adjacent lower ends thereof being rigidly joined by a cross rod extending transversely therebetween whereby an open space is defined above the cross rod and transversely between the front legs, and said gate member having a retainer integrally and monolithically joined thereto and protruding forwardly therefrom in the vicinity of said upper edge so that said retainer protrudes into the space above said cross rod, said channel structure cooperating with said retainer so that the cross rod snaps into a position disposed below the retainer when the upper portion of the gate member is inserted into the channel structure to effect positive retention of the gate member therein.

3. A shopping cart according to claim 1, wherein said connecting frame includes a pair of sidewardly spaced and generally parallel rod elements which at upper ends terminate in loops which define said hinge part and are surroundingly engaged with said cross shaft, and said channel structure including a pair of sidewardly spaced but transversely aligned hooks which are formed of wire rod and define downwardly-opening U-shaped channels to confine the upper edge of the gate member therein.

4. A shopping cart according to claim 3, wherein said connecting frame includes a first U-shaped frame formed of wire rod and having legs which define said rod elements, and a second U-shaped frame formed of wire rod and having parallel side legs which define said hooks, and said first U-shaped frame having a first transverse bight which crosses and is rigidly joined to the side legs of said second U-shaped frame.

5. A shopping cart according to claim 4, wherein a bight of said second U-shaped frame is positioned adjacent a lower edge of the gate member.

6. A shopping cart according to claim 5, wherein the pair of hooks are positioned inwardly between said pair of rod elements.

7. A shopping cart according to claim 4, wherein each said hook is defined by a pair of substantially identical downwardly-opening hook parts disposed in adjacent but sidewardly spaced and transversely aligned relationship.

8. A shopping cart according to claim 7, wherein the pair of downwardly-opening hook parts associated with each said hook include front legs which protrude downwardly adjacent a front surface of said gate member and which adjacent lower ends are rigidly joined by a transverse cross rod so that the front legs and cross rod define a generally U-shaped rod structure which overlaps the front side of the gate member directly adjacent the upper edge thereof, and said gate member having a retainer fixedly and monolithically associated therewith and protruding outwardly from the front surface thereof for cooperation with each said hook, said retainer being disposed closely adjacent the upper edge of the gate member and protruding downwardly a small extent and having a ramp-like configuration which slopes outwardly from the front surface so as to terminate at a downward-facing abutment surface at a lower end thereof, said retainer being disposed so as to be positioned between the front legs of the hook parts with the transverse cross rod being disposed below the abutment surface so as to prevent separation of the gate member from the hook.

9. A shopping cart according to claim 4, wherein the parallel legs of said second U-shaped frame are elongate and sidewardly spaced and extend vertically upwardly from the respective transverse bight and terminate at said hooks at upper ends thereof, each said latter leg having a connecting plate fixed thereto adjacent a lower end thereof and projecting transversely into said gate member, and said connecting part comprising a connecting pin extending parallel to said cross shaft and seated within aligned openings defined in said connecting plate and said gate member.

10. A shopping cart according to claim 9, including a collapsible child seat assembly hingedly carried on said rear gate assembly, said collapsible child seat assembly including a platelike back member positioned adjacent a front side of said gate member and having a lower end hingedly coupled to said connecting pin so that the back member can swing in a vertical plane between closed and open positions of said seat assembly.

11. A shopping cart according to claim 10, wherein said collapsible child seat assembly includes a platelike seat member hingedly connected adjacent its front edge to said back member, and hingedly and slidably connected adjacent its rear edge to said gate member, said gate member defining thereon a pair of elongate, sidewardly-spaced, parallel and opposed guide tracks extending vertically thereof, said guide tracks being integral and monolithic with said molded plastic gate member, and the rear hinge of said seat member having guide rollers engaged with said tracks.

12. A shopping cart according to claim 9, wherein the basket has a pair of sidewardly spaced bumper guards mounted on an upper edge of a front side wall thereof, wherein said connecting frame is positioned adjacent the rear surface of said gate member, and wherein the side legs of said second U-shaped frame extend along the rear surface of the gate member and are spaced apart so as to respectively longitudinally align with the bumper guards so that the bumper guards on a rear cart basket engage and slide along the side legs of said second U-shaped frame associated with the rear gate of a front cart when the basket of the rear cart is nested into the basket of the front cart.

13. A shopping cart according to claim 9, wherein the rear gate member has a pair of sidewardly spaced leg openings formed therethrough, said leg openings being disposed between the side legs of said second U-shaped frame and below the bight of said first U-shaped frame.

14. The shopping cart according to claim 4, wherein the connecting frame includes a reinforcing cross rod disposed upwardly from and extending parallel to said first bight and rigidly connected at opposite ends to said rod elements, said cross rod also crossing the side legs of said second U-shaped frame and being rigidly joined thereto at the crossing points.

15. A vertically-swingable rear gate assembly for association with an open rear side of a shopping cart basket, comprising:

a monolithic one-piece platelike molded plastic gate member having height and width dimensions so as to substantially close off an open upright rear side of a shopping cart basket;

a rigid one-piece connecting frame disposed primarily adjacent one side of said gate member and including a pair of generally transversely aligned hinge parts disposed adjacent upper corners of said gate member for providing a vertical hinged connection to the shopping cart;

said connecting frame, adjacent an upper end thereof, including a generally downwardly opening, transversely extending channel structure engaged over and confining an upper edge of said gate member; and a connecting part connected between said connecting frame and said gate member at a location spaced downwardly a substantial distance from an upper edge thereof to fixedly join said connecting frame to said gate member.

16. A rear gate assembly according to claim 15, wherein the channel structure is defined by a first side leg which joins to the connecting frame adjacent said one side of the gate member and which joins to a bight which passes over the upper edge of the gate member and which then joins to the second side leg which protrudes downwardly so as to overlap the other side of said gate member, and said gate member having a retainer structure which protrudes outwardly from said other side thereof in the vicinity of said upper edge and which creates a snap engagement with the second leg of said channel structure so that a part of said second leg is disposed at least partially below said retainer structure to positively secure the gate member in engagement with the channel structure.

17. A rear gate assembly according to claim 15, wherein said connecting frame is defined principally by wire rod members which are rigidly joined together.

18. A rear gate assembly according to claim 15, wherein said connecting frame has a top part disposed adjacent a rear side of said gate member and defining a pair of generally aligned hinge connectors which are disposed uniformly on opposite sides of a longitudinally extending centerline of said gate member, said top part also having a pair of generally downwardly-opening U-shaped hooks which define said channel structure and which are disposed in aligned relationship generally on opposite sides of said longitudinal centerline and sized to permit an upper edge portion of said gate member to be slidably inserted into said channels;

said connecting frame also including a lower part rigidly joined to said upper part and disposed adjacent the rear side of said gate member; and a fastener connected between said lower part and said gate member at a location spaced downwardly from the upper edge thereof to fixedly join the connecting frame to said gate member so as to retain the gate member within said channel, whereby the upper portion of the gate member is free of permanent connection to said connector frame.

19. A rear gate assembly according to claim 18, wherein said U-shaped hook has a front leg which is cantilevered downwardly so as to overlap a front side of the gate member in the vicinity of the upper edge thereof, said front leg having a generally upwardly-opening U-shaped configuration; and said gate member having a pair of retainers which are integral and monolithic parts of said gate member and which are disposed in sidewardly spaced relationship closely adjacent the upper edge of the gate member and which protrude outwardly from the other side thereof, each said retainer being positioned so as to cooperate with the U-shaped front leg of one of said hooks so that the retainer creates a snap engagement with the hook and protrudes into the interior of the U-shaped front leg to prevent the gate member from being easily withdrawn from the channels defined by the hooks.

20. A rear gate assembly according to claim 18, wherein said upper and lower parts of said connecting frame are defined primarily of wire rod.

21. A rear gate assembly according to claim 15, wherein said connecting frame includes first and second upwardly-opening U-shaped frames each formed from an elongate wire rod, said first U-shaped frame having a pair of generally parallel and upright side legs joined adjacent lower ends thereof by a first transverse bight, said second U-shaped frame including a pair of generally parallel upright side legs joined at lower ends to a second transverse bight, said second bight being disposed vertically downwardly a substantial distance from and extending generally parallel to said first bight, and the side legs of said second frame being disposed generally parallel to and spaced inwardly from the side legs of said first frame, said first and second frames being rigidly joined where they cross.

22. A rear gate assembly according to claim 21, wherein the side legs of said first U-shaped frame define hinge parts adjacent upper ends thereof, and wherein the side legs of said second U-shaped frame define said downwardly-opening channels adjacent upper ends thereof for confining the upper end portion of said gate member therein.

* * * * *